(12) United States Patent
Yanagawa et al.

(10) Patent No.: US 8,573,526 B2
(45) Date of Patent: Nov. 5, 2013

(54) WEBBING TAKE-UP DEVICE

(75) Inventors: Wataru Yanagawa, Aichi-ken (JP); Masaru Ukita, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 256 days.

(21) Appl. No.: 13/188,089

(22) Filed: Jul. 21, 2011

(65) Prior Publication Data

US 2012/0032017 A1 Feb. 9, 2012

(30) Foreign Application Priority Data

Aug. 3, 2010 (JP) .................................. 2010-174414

(51) Int. Cl.
*B65H 75/48* (2006.01)

(52) U.S. Cl.
USPC .......................................... 242/379; 242/374

(58) Field of Classification Search
USPC ................................................. 242/374, 379
See application file for complete search history.

(56) References Cited

U.S. PATENT DOCUMENTS

| 6,152,391 | A * | 11/2000 | Nagata et al. | 242/374 |
|---|---|---|---|---|
| 6,318,664 | B1 * | 11/2001 | Sumiyashiki | 242/379 |
| 7,427,044 | B2 * | 9/2008 | Takamatsu | 242/374 |
| 7,546,968 | B2 * | 6/2009 | Kitazawa et al. | 242/374 |
| 7,624,940 | B2 * | 12/2009 | Kitazawa et al. | 242/374 |
| 8,292,208 | B2 * | 10/2012 | Yanagawa et al. | 242/374 |
| 2006/0186249 | A1 * | 8/2006 | Kitazawa et al. | 242/379 |
| 2008/0116309 | A1 * | 5/2008 | Takamatsu et al. | 242/374 |

FOREIGN PATENT DOCUMENTS

JP 2009-241864 10/2009

* cited by examiner

*Primary Examiner* — Sang Kim
(74) *Attorney, Agent, or Firm* — Roberts Mlotkowski Safran & Cole, P.C.

(57) ABSTRACT

A webbing take-up device comprising a take-up shaft on which webbing is taken up; a movement member that is moved at a specific occasion such as a vehicle collision is detected or there is rapid vehicle deceleration; a rotation member comprising a coaxially provided rotation shaft support portion and recess portion formed at an end portion in an axial direction of the rotation shaft support portion, the take-up shaft being rotated in the take-up direction by the rotation member meshing with the movement member and being rotated during movement of the movement member; and a cover member disposed on a rotation shaft support portion side of the rotation member, the cover member comprising a plate portion, a substantially ring shaped wall that projects out from the plate portion towards a rotation member side and is accommodated in the recess portion, and a shaft bearing hole formed in the plate portion and the substantially ring shaped wall for supporting the rotation shaft support portion.

5 Claims, 8 Drawing Sheets

WEBBING TAKE-UP DEVICE

CROSS-REFERENCE TO RELATED APPLICATION

This application claims priority under 35 USC 119 from Japanese Patent Application No. 2010-174414 filed on Aug. 3, 2010, the disclosure of which is incorporated by reference herein.

BACKGROUND OF THE INVENTION

Technical Field

The present invention relates to a webbing take-up device for taking up webbing fitted across a vehicle occupant.

A seatbelt retractor described in Japanese Patent Application Laid-Open (JP-A) No. 2009-241864 is equipped with a pretensioner mechanism that forcibly rotates a guide drum in a take-up direction, for example in the event of a vehicle collision.

The pretensioner mechanism in such a seatbelt retractor is actuated, for example in the event of a vehicle collision, a piston is moved, and a rack provided to the piston is meshed with a pinion and rotates the pinion. The guide drum is rotated in the take-up direction when the pinion is rotated.

A support portion is provided on one axial direction side of the pinion, and the support portion is fitted into a support hole in a cover plate, such that the pinion is rotatably supported by the cover plate.

However, the plate thickness of the cover plate needs to be thick to ensure the strength of the support hole due to the great force that acts on the support hole in the cover plate when the pretensioner mechanism is actuated.

Furthermore, in order to maintain the operational efficiency from the rack to the pinion, making the plate thickness of the cover plate thick such that an axial direction length of the cover plate becomes long thereby securing meshing faces between the rack and the pinion.

The resulting seatbelt retractor is hence bulky, and the weight of the seatbelt retractor is heavy.

SUMMARY

The present invention is made in consideration of the above circumstances and is directed towards provision of a webbing take-up device that can achieve greater compactness and lightness.

A webbing take-up device of a first aspect of the present invention includes: a take-up shaft on which webbing for fitting over a vehicle occupant is taken up by rotating the take-up shaft in a take-up direction; a movement member that is moved at a specific occasion such as when a vehicle collision is detected or when there is rapid vehicle deceleration, such that the movement member meshes with a rotation member; the rotation member including a coaxially provided rotation shaft support portion and recess portion formed at an end portion in an axial direction of the rotation shaft support portion, the take-up shaft being rotated in the take-up direction by the rotation member meshing with the movement member and being rotated during movement of the movement member; and a cover member disposed on a rotation shaft support portion side of the rotation member, the cover member including a plate portion, a substantially ring shaped wall that projects out from the plate portion towards a rotation member side and is accommodated in the recess portion, and a shaft bearing hole formed in the plate portion and the substantially ring shaped wall for supporting the rotation shaft support portion.

The webbing take-up device of the first aspect may be configured, as a webbing take-up device of a second aspect of the present invention, such that the movement member meshes with a portion of the recess portion of the rotation member; and the projection height on the movement member side of the substantially ring shaped wall is lower on a side of meshing between the movement member and the rotation member and higher on an opposite side to the meshing side.

The webbing take-up device of the first and second aspects may be configured, as a webbing take-up device of a third aspect of the present invention, such that the substantially ring shaped wall has a shape which is formed along a peripheral edge of the shaft bearing hole.

The webbing take-up device of the first aspect may be configured, as a webbing take-up device of a fourth aspect of the present invention, such that the movement member meshes with a portion of the recess portion of the rotation member; and the substantially ring shaped wall is not formed at a side of meshing between the movement member and the rotation member but is formed at an opposite side to the meshing side.

In the webbing take-up device of the first aspect, the rotation member is rotated by the movement member moving and meshing with the rotation member on a specific occasion such as when a vehicle collision is detected or when there is rapid vehicle deceleration. The take-up shaft is accordingly rotated in the take-up direction and the webbing is taken up on the take-up shaft.

However, the rotation member is coaxially provided with the rotation shaft support portion, with the plate portion of the cover member disposed on the rotation shaft support portion side of the rotation member, and the rotation shaft support portion supported by the shaft bearing hole of the cover member.

A tilting moment from the movement member acts on the rotation member when the movement member is rotating the rotation member.

In the cover member, the substantially ring shaped wall projects out from the plate-portion, and the shaft bearing hole is formed in the plate portion and the substantially ring shaped wall.

The length in the rotation member axial direction over which the rotation member is supported by the shaft bearing hole is accordingly lengthened.

The strength of the shaft bearing hole can accordingly be secured due to increasing support surface area for the rotation member by the shaft bearing hole. Since tilting of the rotation member can also be suppressed when the movement member is rotating the rotation member, sufficient meshing of the rotation member and the movement member is achieved, and the operational efficiency (transmission efficiency) from the movement member-to the rotation member can be raised.

Consequently, by suppressing the thickness of the cover member from becoming thicker in the rotation member axial direction, a webbing take-up device can be achieved to be more compact and lighter.

Furthermore, the substantially ring shaped wall projects out to the rotation member side, a recess portion is formed at the rotation member in a region at an end portion in an axial direction of the rotation shaft support portion, with the substantially ring shaped wall accommodated inside the recess portion.

By thus shortening the separation distance between the point of action of force from the movement member acting on the rotation member and the shaft bearing hole, in the rotation member axial direction, the tilting moment acting on the rotation member can be lessened. The rotation member can accordingly be made more difficult to tilt.

The recess portion can accommodate the projection of the substantially ring shaped wall towards the rotation member side, and the webbing take-up device can be efficiently made more compact.

In the webbing take-up device of the second aspect, the movement member meshes with a portion of the recess portion of the rotation member, and the projection height on the movement member side of the substantially ring shaped wall is lower on the side of meshing between the movement member and the rotation member and higher on the opposite side to the meshing side. Hence, even when the substantially ring shaped wall is disposed in the movement path of the movement member, teeth of the movement member for meshing with the rotation member can be suppressed from impinging on the substantially ring shaped wall. Accordingly, the dimension of the teeth of the movement member for meshing with the rotation member is not necessary to be made smaller, and the strength of the teeth can be raised.

In the webbing take-up device of the third aspect, the substantially ring shaped wall has a shape which is formed along the peripheral edge of the shaft bearing hole. The strength of the shaft bearing hole can accordingly be secured and tilting of the rotation member can also be suppressed.

In the webbing take-up device of the fourth aspect, the movement member meshes with a portion of the recess portion of the rotation member, and the substantially ring shaped wall is not formed at the side of meshing between the movement member and the rotation member but is formed at the opposite side to the meshing side. With such a shape of the substantially ring shaped wall, the strength of the shaft bearing hole can also be secured and tilting of the rotation member can also be suppressed. And a compact and lightweight cover member and webbing take-up device can be achieved.

BRIEF DESCRIPTION OF THE DRAWINGS

FIG. 6A is a horizontal cross-section (a cross-section taken on line 6-6 of FIG. 5) illustrating a state in which a rack is meshed with a pinion in a webbing take-up device according to an exemplary embodiment of the present invention shown in.

DESCRIPTION

Figure 2:
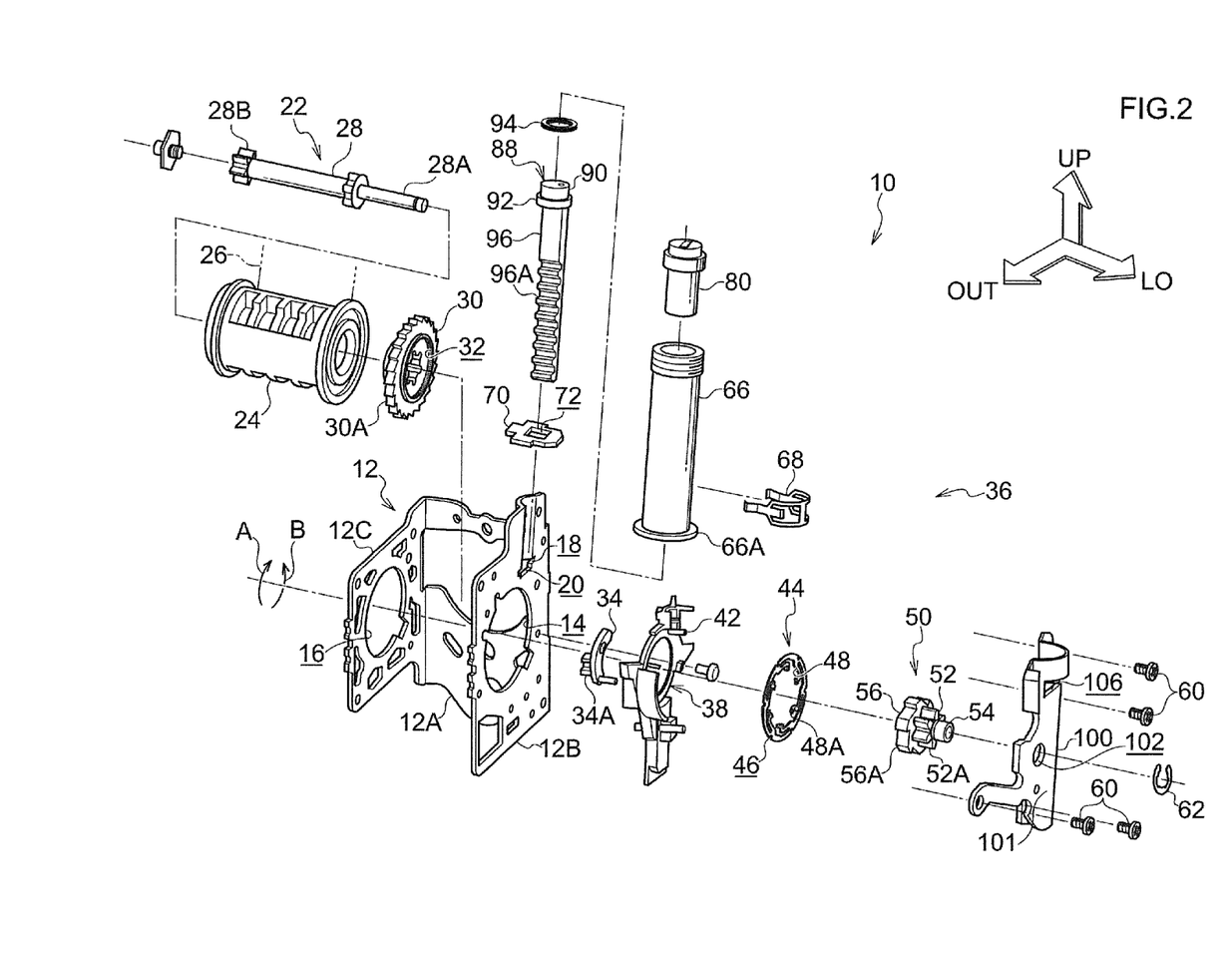
FIG. 2 is an exploded perspective view illustrating a webbing take-up device of an exemplary embodiment of the present invention, as seen from a vehicle width direction outside and one side in the vehicle front-rear direction.
Figure 3:
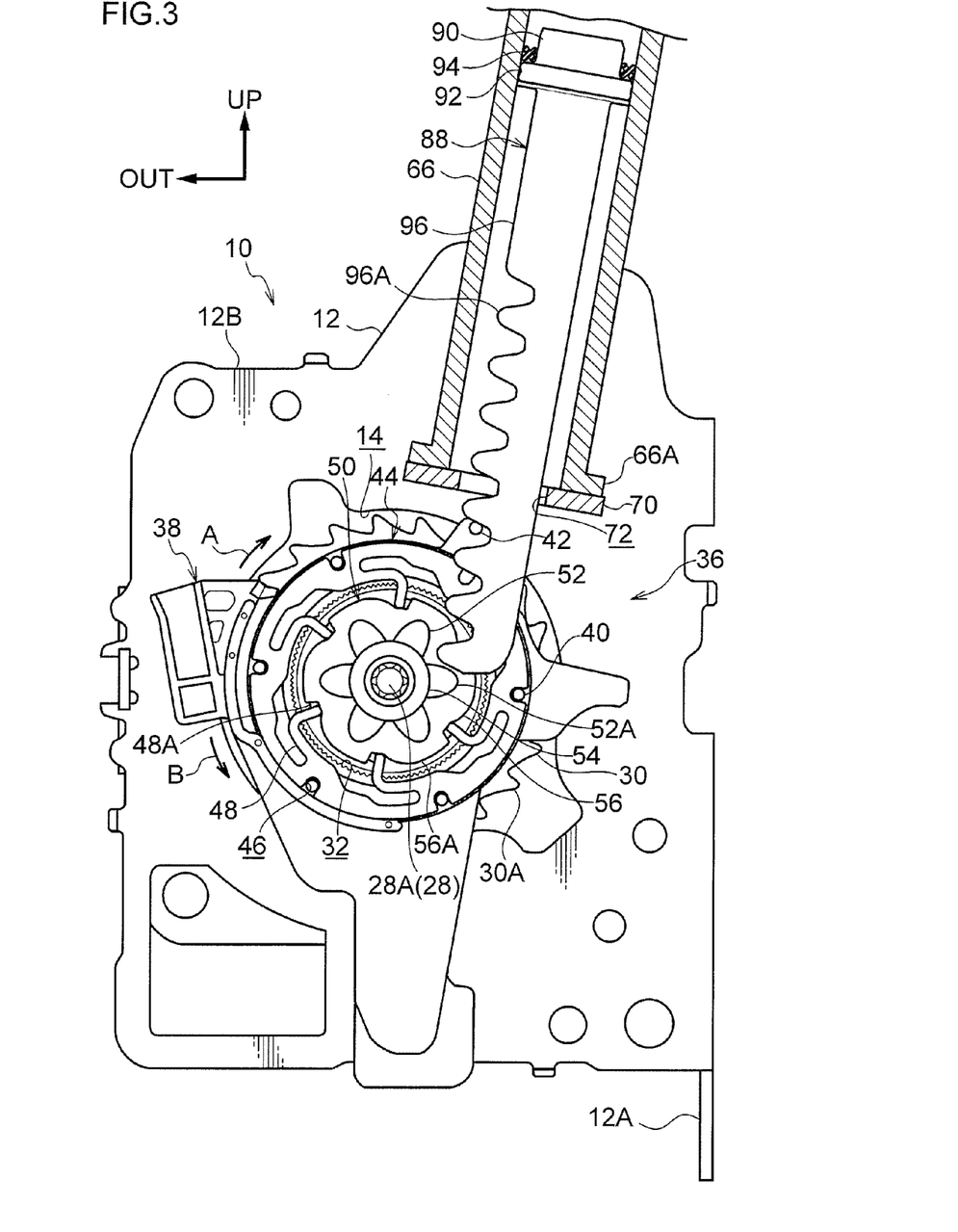
FIG. 3 is a side view from one side in the vehicle front-rear direction illustrating a webbing take-up device of an exemplary embodiment of the present invention.

FIG. 2 is an exploded perspective view of a webbing take-up device 10 to which a pretensioner mechanism 36 according to a first exemplary embodiment of present invention is applied, as viewed from the vehicle width direction outside and one side in the vehicle front-rear direction. FIG. 3 is a side view illustrating the webbing take-up device 10 as viewed from the one side in the vehicle front-rear direction. In the drawings, the arrow OUT indicates the vehicle width direction outside, the arrow LO indicates one side in the vehicle front-rear direction, and the arrow UP indicates the upwards direction.

As shown in FIG. 2 and FIG. 3, the webbing take-up device 10 according to the first exemplary embodiment is provided with a frame 12 serving as a main body member and U-shaped in cross-section. The frame 12 includes a back plate 12A on the vehicle width direction inside, a leg plate 12B on one side in the vehicle front-rear direction, and a leg plate 12C on the other side in the vehicle front-rear direction. The webbing take-up device 10 is mounted to a vehicle with the frame 12 fixed to the vehicle by the back plate 12A.

The leg plate 12B and the leg plate 12C have a placement hole 14 and a placement hole 16 formed respectively through each other in circular shapes, with the placement hole 14 and the placement hole 16 facing each other. A rectangular shaped first engagement hole 18 is formed through the leg plate 12B above and on the back plate 12A side of the placement hole 14. The first engagement hole 18 is disposed substantially horizontal. A rectangular shaped second engagement hole 20 is formed through the leg plate 12B directly below the first engagement hole 18. The second engagement hole 20 is disposed parallel to the first engagement hole 18 and communicates with the first engagement hole 18.

A winding shaft 22 is rotatably supported between the leg plate 12B (the placement hole 14) and the leg plate 12C (the placement hole 16) of the frame 12.

A substantially circular cylindrical shaped spool 24 serving as a winding member is provided to the winding shaft 22. Long strip shaped webbing 26 (belt) is wound onto the spool 24 from the proximal end of the webbing 26. The webbing 26 extends out above the frame 12 and is capable of fitting across an occupant seated in a vehicle seat (not shown in the drawings). The webbing 26 is wound onto the spool 24 by rotation of the spool 24 in a take-up direction (the arrow A direction in FIG. 2 and FIG. 3), and the spool 24 is rotated in the pullout direction (the arrow B direction in FIG. 2 and FIG. 3) by the webbing 26 being pulled out from the spool 24.

A torsion shaft 28 is inserted coaxially inside the spool 24 and serves as an energy absorbing member configuring a force-limiter mechanism. A first end 28A of the torsion shaft 28 projects out from a first end face of the spool 24, on the leg plate 12B side. A second end 28B of the torsion shaft 28 is fixed so as to be incapable of relative rotation inside a second end of the spool 24, on the leg plate 12C side. The torsion shaft 28 is accordingly capable of rotation as one unit with the spool 24.

A substantially circular pillar shaped lock gear 30 is provided at one end of the spool 24. The torsion shaft 28 passes through the lock gear 30 coaxially. The torsion shaft 28 is fixed to the lock gear 30 so as to be incapable of relative rotation. The lock gear 30 is accordingly capable of rotation as one unit with the torsion shaft 28. Ratchet teeth 30A (external teeth) are formed around the entire external circumference of the lock gear 30.

A circular pillar shaped ratchet recess 32 is formed configuring a ratchet mechanism in the face of the lock gear 30 opposite side of the spool 24 with the outer peripheral face of the ratchet recess 32 having a high coefficient of friction.

A biasing mechanism (not shown in the drawings) is provided as biasing means to the outside of the leg plate 12C of the frame 12. The biasing mechanism is coupled to the spool 24 and acts to impart biasing force to the spool 24 in the take-up direction.

A plate shaped lock plate 34 serving as a restriction member (lock member) is rotatably supported on the leg plate 12B of the frame 12 in the vicinity of the placement hole 14. Lock teeth 34A are formed to the lock plate 34. The lock plate 34 is coupled to a lock mechanism (not shown in the drawings) serving as restriction means (lock means). The lock plate 34 is rotated due to actuation of the lock mechanism when the webbing 26 is abruptly pulled out from the spool 24 and when rapid vehicle deceleration occurs, and the lock teeth 34A mesh (engage) with the ratchet teeth 30A of the lock gear 30. Rotation of the lock gear 30 in the pullout direction is hence restricted (locked), thereby restricting rotation of the spool 24 in the pullout direction (while rotation of the spool 24 in the take-up direction is permitted).

The pretensioner mechanism 36 is provided as a rack and pinion on the outside of the leg plate 12B of the frame 12.

A substantially circular ring shaped gear case 38 made from a resin serves as a protection member provided to the pretensioner mechanism 36. The gear case 38 is fixed to the leg plate 12B. The external peripheral portion of the gear case 38 covers the external peripheral portion of the lock gear 30. The ratchet recess 32 of the lock gear 30 is disposed inside the gear case 38 and the first end 28A of the torsion shaft 28 passes through the gear case 38.

A specific number of circular pillar shaped retaining pins 40 (shear pins) are integrally formed at the external peripheral portion of the gear case 38. The retaining pins 40 project out from the gear case 38 away from the lock gear 30. A circular pillar shaped engaging pin 42 (shear pin) is integrally formed at an upper portion of the gear case 38. The engaging pin 42 projects out from the gear case 38 away from the leg plate 12B.

A substantially circular ring plate shaped clutch plate 44 is disposed as a clutch member configuring a clutch mechanism on the side of the gear case 38 away from the lock gear 30. The external peripheral edge of the clutch plate 44 is formed with a specific number of semi-circular mounting holes 46 disposed at even intervals around the circumferential direction of the clutch plate 44. The retaining pins 40 of the gear case 38 fit into the mounting holes 46 and the clutch plate 44 is thereby retained on the gear case 38.

A specific number (six in the present exemplary embodiment) of L-shaped plate extending portions 48 are integrally formed on the inner periphery of the clutch plate 44. The extending portions 48 are disposed at even intervals around the circumferential direction of the clutch plate 44. Pillar shaped teeth insertion portions 48A are integrally formed at the distal ends of the extending portions 48. The teeth insertion portions 48A project out from the extending portions 48 towards the gear case 38 and are inserted through the inside of the gear case 38 in the ratchet recess 32 of the lock gear 30. The teeth insertion portions 48A are separated from the outer peripheral face of the ratchet recess 32, and the clutch plate 44 permits rotation of the lock gear 30.

A pinion 50 is provided as a drive member on the inner peripheral side of the clutch plate 44. The first end 28A of the torsion shaft 28 passes coaxially through the pinion 50 and is capable of relative rotation with respect to the pinion 50. A cog wheel 52 is provided at an axial direction intermediate portion of the pinion 50. Pinion teeth 52A are formed around the entire circumference of the cog wheel 52. A circular pillar shaped rotation shaft support 54 is formed coaxially to the pinion 50 at a portion of the pinion 50 on the side away from the lock gear 30.

Figure 1A:
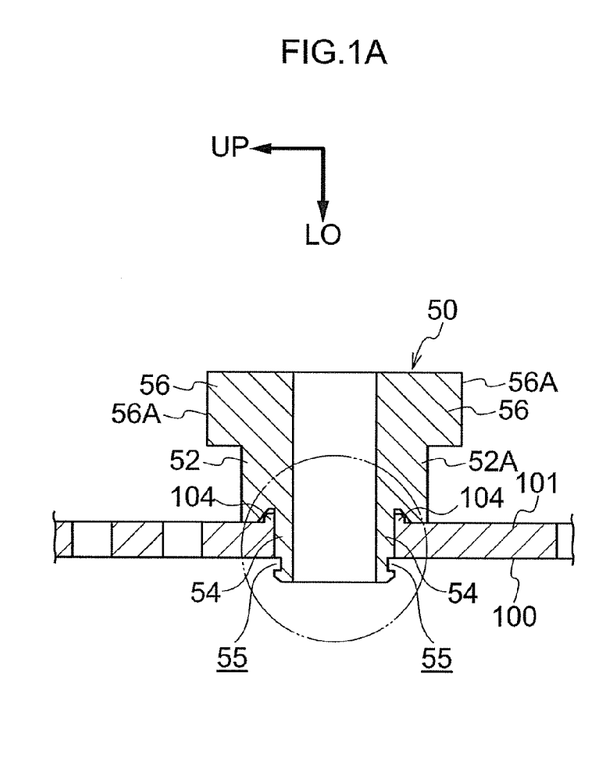
FIG. 1A is a vertical cross-section (a cross-section taken on line 1-1 of FIG. 5) illustrating a state in which a rotation shaft support portion of a pinion has passed through a circular hole in a cover plate in a webbing take-up device according to an exemplary embodiment of the present invention.
Figure 1B:
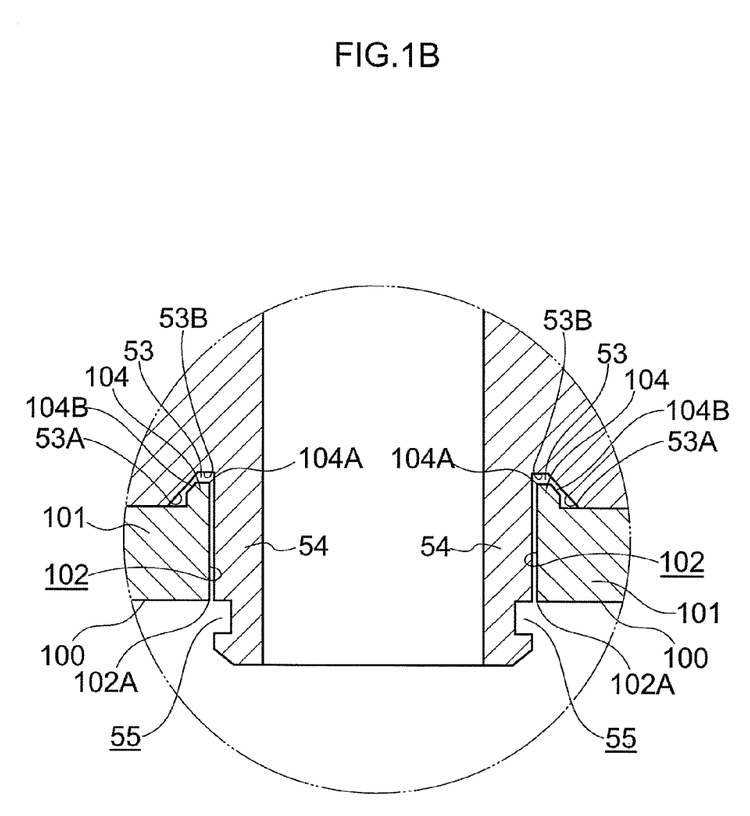
FIG. 1B is an enlarged vertical cross-section of the state shown in FIG. 1A.

As shown in FIG. 1A and FIG. 1B, a substantially trapezoidal cross-sectioned recess portion 53 serving as a recess portion is provided at a side face around the entire circumference of the rotation shaft support 54 of the cog wheel 52. The recess portion 53 is formed around the circumferential direction of the rotation shaft support 54. A beveled face 53A is provided on a radial direction outside portion of the recess portion 53. The beveled face 53A slopes toward the pinion 50 radial direction outside on progression away from the lock gear 30. A bottom face 53B is formed between the beveled face 53A and the rotation shaft support 54. The bottom face 53B is disposed perpendicular to the rotation shaft support 54 axial direction and meets the beveled face 53A and the rotation shaft support 54.

A clutch portion 56 for configuring a clutch mechanism is formed at a portion of the lock gear 30 side of the pinion 50. The clutch portion 56 is inserted into the ratchet recess 32 of the lock gear 30. A specific number (six in the present exemplary embodiment) of projections 56A are formed to the outer peripheral face of the clutch portion 56. The projections 56A are disposed at even intervals around the circumferential direction of the clutch portion 56 and each have projection heights that gradually increase in height on progression along the pullout direction. The teeth insertion portions 48A of the clutch plate 44 are mounted to (in press-contact with) the clutch portion 56 at portions of the respective projections 56A on the take-up direction side. The pinion 50 is accordingly retained to the clutch plate 44.

A metal plate shaped cover plate 100 is provided as cover member to the frame 12 on the outside of the leg plate 12B. The cover plate 100 is fixed (fastened) to the leg plate 12B by plural fixing screws 60. The cover plate 100 covers the gear case 38, the clutch plate 44 and the pinion 50 from the side away from the lock gear 30.

As shown in FIG. 1A, FIG. 1B and FIG. 2, the cover plate 100 includes a plate portion 101. A circular cross-sectioned circular hole 102 is provided in the plate portion 101 as a shaft bearing hole. A circular ring shaped bar-ring molding 104 of substantially rectangular cross-section is formed as a substantially ring shaped wall projecting out around the entire circumference of the circular hole 102 on the pinion 50 side (the pinion teeth 52A side) of the plate portion 101. The circular hole 102 is configured by the inside of the bar-ring molding 104. A beveled face 104B is provided to a portion at the radial direction outside of the bar-ring molding 104. The beveled face 104B slopes towards the radial direction outside of the bar-ring molding 104 on progression away from the lock gear 30. The edge of the circular hole 102 on the side away from the pinion 50 (away from the pinion teeth 52A) configures an edge portion 102A. The edge of the circular hole 102 on the pinion 50 side (the pinion teeth 52A side) configures an edge portion 104A.

The dimension of the internal diameter of the circular hole 102 is slightly larger than the dimension of the external diameter of the rotation shaft support 54 of the pinion 50. The rotation shaft support 54 passes through the circular hole 102 and the cover plate 100 rotatably supports the pinion 50 at the circular hole 102. A rectangular cross-section grooved portion 55 is provided in the outer peripheral face of the rotation shaft support 54 at a location further away from the leg plate 12B than the cover plate 100. The grooved portion 55 is formed along the circumferential direction of the rotation shaft support 54. A K-ring 62 of substantially C-shape when viewed face-on is fitted over and fixed in the grooved portion 55 as an engaging member. The pinion 50 is restrained from detaching from the cover plate 100 by the K-ring 62 engaging with the cover plate 100.

The pinion 50 is accordingly capable of moving in the radial direction by an amount of the difference between the inner diameter dimension of the circular hole 102 and the external diameter dimension of the rotation shaft support 54. The bar-ring molding 104 is accommodated in the recess portion 53 of the pinion 50 with the beveled face 53A and the bottom face 53B of the recess portion 53 always in a non-contact state.

As shown in FIG. 2 and FIG. 3, a circular cylindrical shaped cylinder 66 is provided as a cylinder member between the leg plate 12B of the frame 12 and the cover plate 100. The cylinder 66 extends out upwards from the leg plate 12B and the cover plate 100.

Above the cover plate 100 the cylinder 66 fits inside a cylinder holder 68 of a plate shaped into a substantially U-shaped cross-section. The two length direction end portions of the cylinder holder 68 engage and are fixed to an upper portion of the leg plate 12B. The cylinder holder 68 thereby restricts movement of the cylinder 66 in the radial direction and holds the cylinder 66.

A peripheral edge portion 66A is integrally formed at the bottom end of the cylinder 66. The peripheral edge portion 66A projects out around the entire external circumference of the cylinder 66. The peripheral edge portion 66A fits into the first engagement hole 18 in the leg plate 12B and the upper portion of the third engagement hole 106 in the cover plate 100.

A substantially rectangular shaped piston stopper 70 is disposed as a stopper member directly below the cylinder 66. The piston stopper 70 makes contact (face contact) with the bottom end of the cylinder 66 (including the peripheral edge portion 66A) and fits into the second engagement hole 20 in the leg plate 12B and the lower portion of the third engagement hole 106 in the cover plate 100. Movement of the piston stopper 70 and movement of the cylinder 66 in the axial direction are thereby stopped, with the piston stopper 70 and the cylinder 66 fixed between the leg plate 12B and the cover plate 100.

A rectangular shaped through hole 72 is formed through the piston stopper 70 such that the inside of the cylinder 66 is open to the upper side of the pinion 50 through the through hole 72. A slight gap is formed at intermittently between the piston stopper 70 and the bottom end of the cylinder 66 (including the peripheral edge portion 66A), such that the inside of the cylinder 66 is in communication with the outside of the cylinder 66 through the gap.

A substantially circular pillar shaped gas generator 80 is fitted and fixed as drive means at the top end inside the cylinder 66. The gas generator 80 closes off the top end of the cylinder 66. The gas generator 80 is electrically connected to a vehicle control device (not shown in the drawings). By actuating the pretensioner mechanism 36 under control of the control device during a vehicle collision (at specific occasions such when a vehicle collision is detected or there is rapid vehicle deceleration) the gas generator 80 instantly generates high pressure gas and supplies the gas into the top end of the cylinder 66.

The gas generator 80 is electrically connected to a vehicle control device (not shown in the drawings). By actuating the pretensioner mechanism 36 under control of the control device during a vehicle collision (at specific occasions such when a vehicle collision is detected or there is rapid vehicle deceleration) the gas generator 80 instantly generates high pressure gas and supplies the gas into the top end of the cylinder 66.

A piston 88 is provided as a movement member inside the cylinder 66.

A circular cylindrical shaped base 90 is provided at the top end of the piston 88, with the base 90 disposed substantially coaxial to the cylinder 66. A circular plate shaped flange 92 is provided to the piston 88 directly below the base 90. The flange 92 is disposed coaxially to the cylinder 66 and projects out around the entire outer periphery of the base 90 and substantially fits against the inner peripheral face of the cylinder 66.

An X-ring 94 of circular ring shape and X-shaped cross-section is disposed as a seal member on the outer periphery of the base 90. The X-ring 94 is made from rubber and has resilience and sealing ability. When in a resiliently deformed state the X-ring 94 makes contact with the outer peripheral face of the base 90, the top face of the flange 92 and the inner peripheral face of the cylinder 66. The X-ring 94 accordingly seals between the cylinder 66 and the piston 88.

A substantially rectangular pillar shaped rack 96 is provided to the piston 88 below the flange 92. Rack teeth 96A are formed to portions of the rack 96 on the side facing away from the back plate 12A. The rack 96 projects out from the bottom end of the cylinder 66 and passes through the through hole 72 in the piston stopper 70. The bottom end of the rack 96 is disposed in the vicinity of the top side of the cog wheel 52 of the pinion 50, with the rack teeth 96A engaged with the engaging pin 42 of the gear case 38.

Figure 6A:
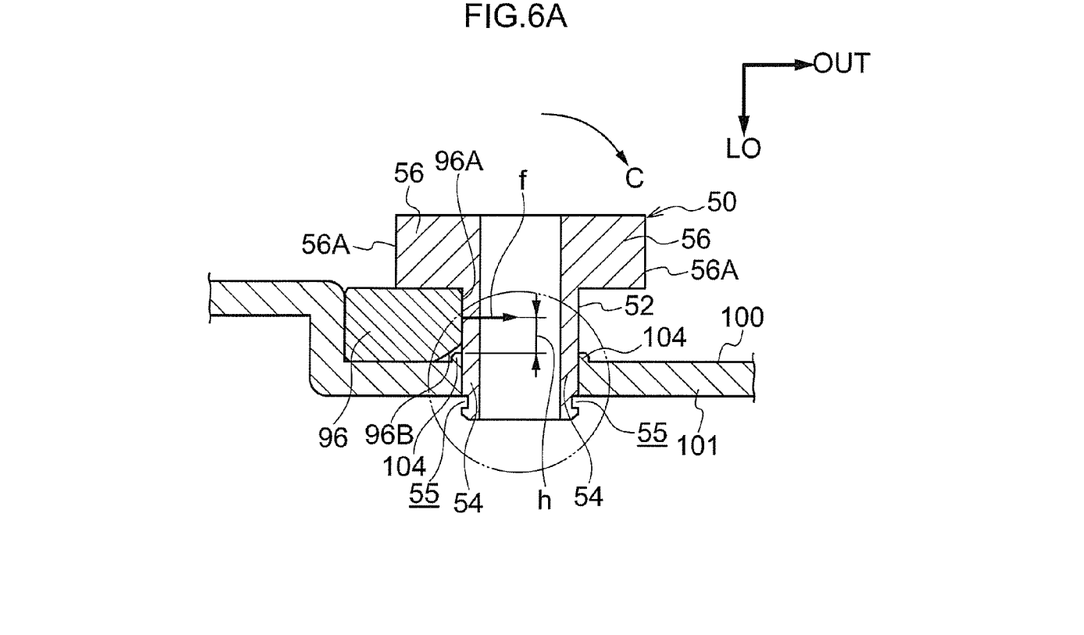
Figure 6B:
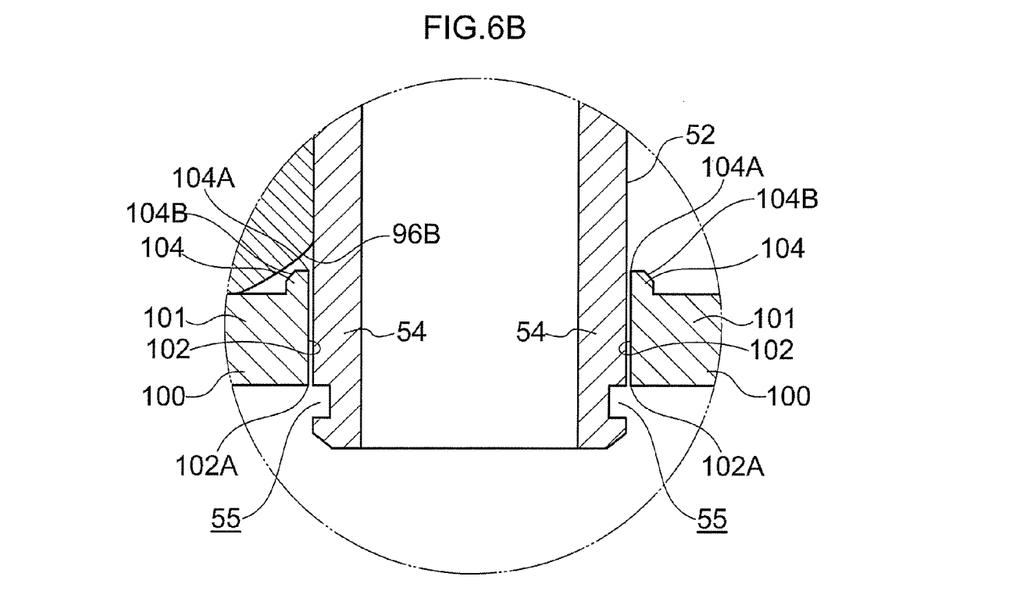
FIG. 6B is an enlarged horizontal cross-section of the state shown in FIG. 6A.

As shown in FIG. 6A and FIG. 6B, non-contact faces 96B are provided as non-contact portions to end portions on the cover plate 100 side of the rack teeth 96A. The non-contact faces 96B are profiled as circular arc faces coaxial to the external peripheral portion of the flange 92, disposed inside the external peripheral portion of the flange 92 in the radial direction.

Explanation next follows regarding operation of the present exemplary embodiment.

With the webbing take-up device 10 configured as described above, when an occupant seated on a vehicle seat has fitted the webbing 26 around him/herself slack in the webbing 26 is removed by action of biasing force of the biasing mechanism acting on the spool 24 in the take-up direction.

By actuation of the lock mechanism during a vehicle collision, when the webbing 26 is abruptly pulled out from the spool 24 and/or there is rapid vehicle deceleration, the lock teeth 34A of the lock plate 34 are meshed with the ratchet teeth 30A of the lock gear 30. Rotation of the lock gear 30 in the pullout direction is thereby restricted, and by restricting rotation of the spool 24 in the pullout direction, the webbing 26 is restricted from being pulled out from the spool 24, with the webbing 26 restraining the occupant.

By actuation of the pretensioner mechanism 36 under control of the control device during a vehicle collision, the gas generator 80 instantly generates high pressure gas and supplies the gas into the top end (a first end) of the cylinder 66. The piston 88 (the base 90 and the flange 92) and the X-ring 94 are hence imparted with a pressing force of the gas from above while a sealed state is maintained by the X-ring 94 between the cylinder 66 and the piston 88. The engaging pin 42 of the gear case 38 engaged with the rack 96 (the rack teeth 96A) of the piston 88 is sheared by the rack teeth 96A, and the piston 88 and the X-ring 94 move downwards (a second side). The rack 96 (the rack teeth 96A) of the piston 88 are meshed with the cog wheel 52 (the pinion teeth 52A) of the pinion 50 and so the pinion 50 is rotated in the take-up direction.

Figure 4:
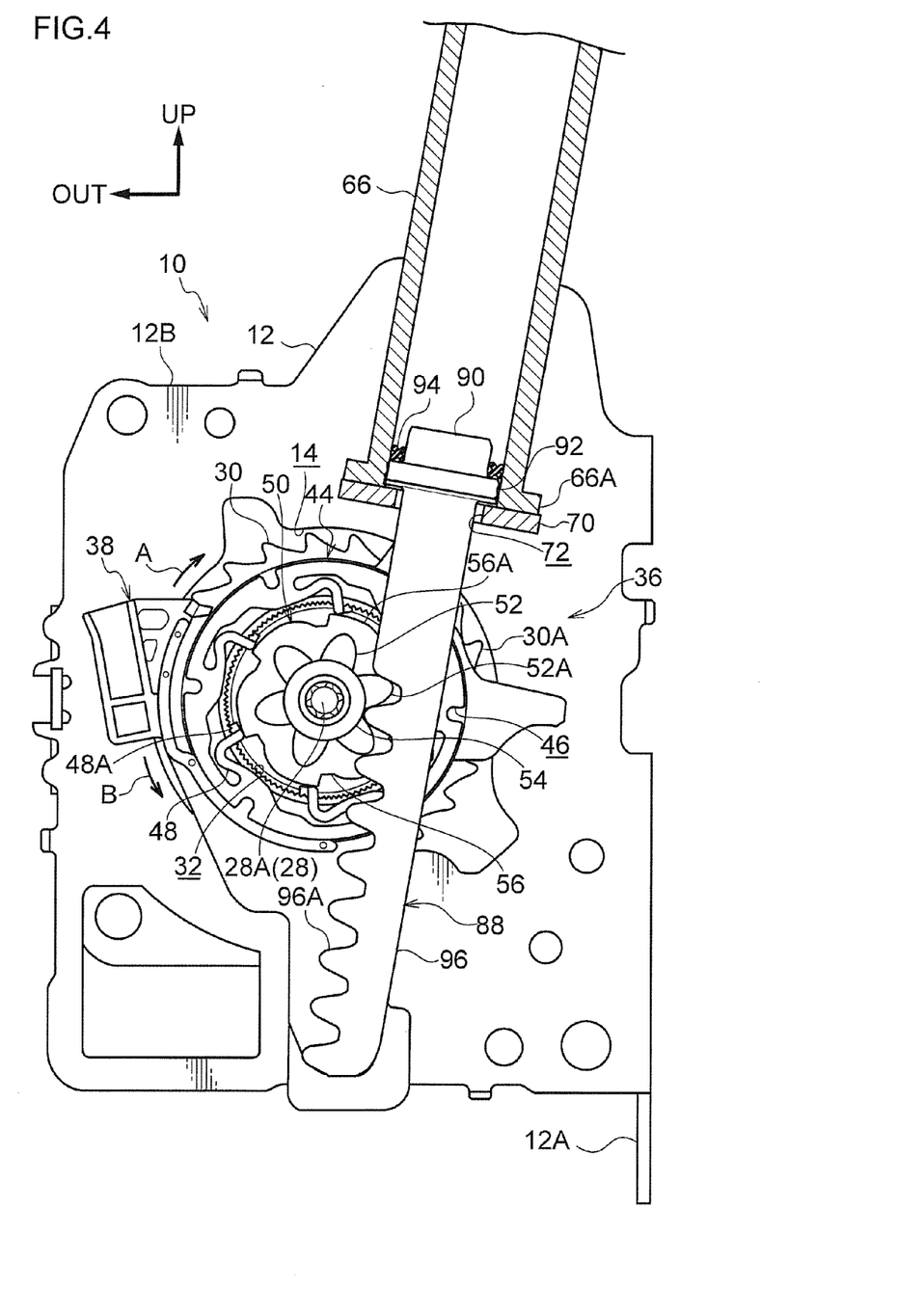
FIG. 4 is a side view illustrating a pretensioner mechanism after actuation in a webbing take-up device according to an exemplary embodiment of the present invention, as seen from one side in the vehicle front-rear direction.

When the pinion 50 is rotated in the take-up direction, as shown in FIG. 4, the teeth insertion portions 48A of the clutch plate 44 relatively move along the clutch portion 56 of the pinion 50 from the take-up direction side portions of the projections 56A to the pullout direction side portions of the projections 56A. The teeth insertion portions 48A are accordingly moved towards the outer peripheral face side of the ratchet recess 32 of the lock gear 30 while the extending portions 48 of the clutch plate 44 deform and move towards the outer peripheral side of the clutch plate 44. The teeth insertion portions 48A are meshed (engaged) between the clutch portion 56 (the peripheral face of the projections 56A) and the lock gear 30 (the outer peripheral face of the ratchet recess 32), enabling the pinion 50, the clutch plate 44, the lock gear 30, the torsion shaft 28 and the spool 24 to be rotated as a single body. The retaining pins 40 of the gear case 38 fitted into the mounting holes 46 of the clutch plate 44 are accordingly sheared by the peripheral edges of the mounting holes 46. By thereby releasing retention of the clutch plate 44 to the gear case 38, the pinion 50, the clutch plate 44, the lock gear 30, the torsion shaft 28 and the spool 24 are rotated as a single body in the take-up direction. The webbing 26 is accordingly taken up on the spool 24, increasing the restraining force of the webbing 26 on the occupant.

Downwards movement of the piston 88 and the X-ring 94 stops when the flange 92 makes contact with the piston stopper 70.

Figure 5:
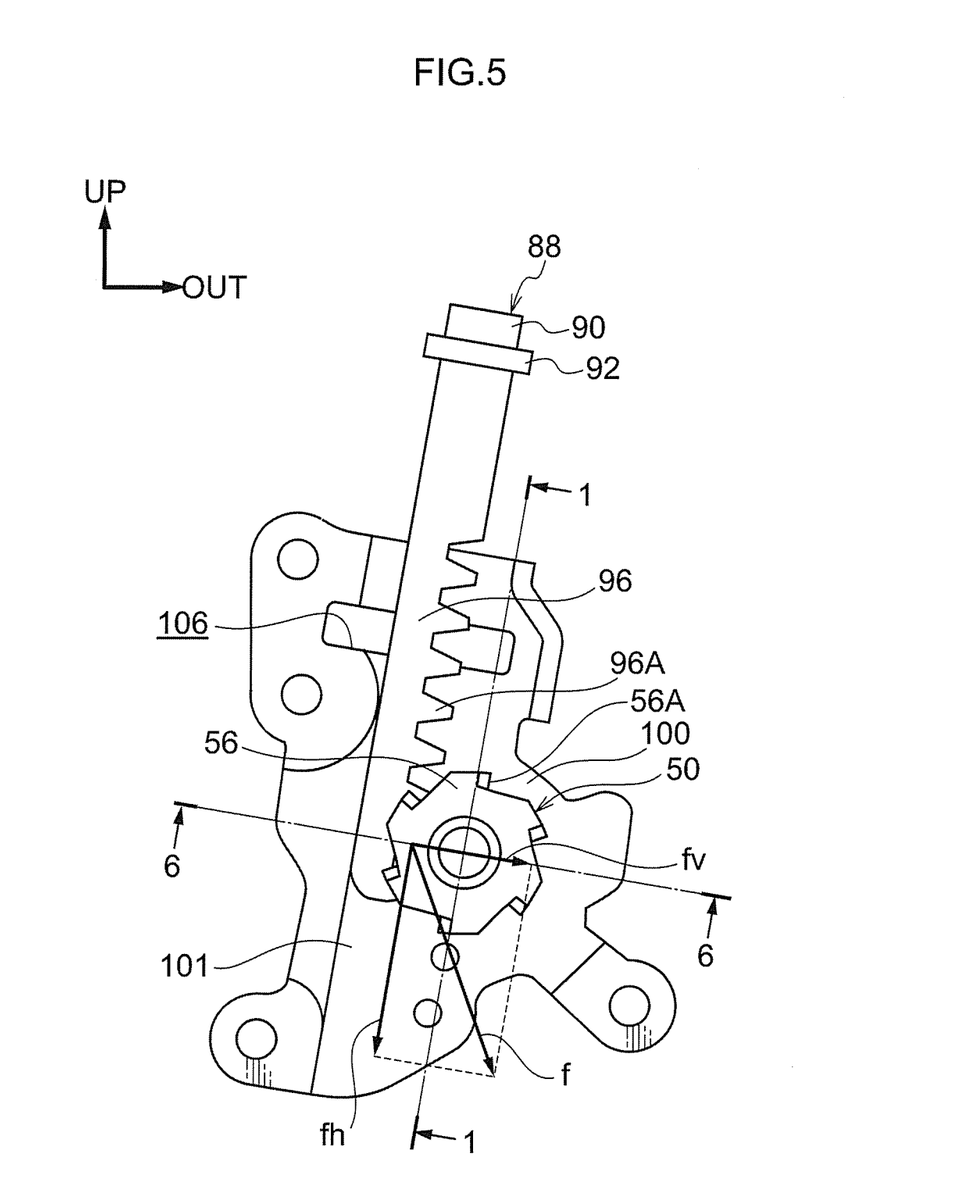
FIG. 5 is a diagram illustrating relevant portions of a webbing take-up device according to an exemplary embodiment of the present invention.

When the rack 96 is moved downwards, as shown in FIG. 5 and FIG. 6A, and the pinion 50 is rotated in the take-up direction, due to the angle of pressing of the pinion teeth 52A, a force f acts on the pinion teeth 52A from the rack teeth 96A that is composed not only by a force fh (force to rotate the pinion 50) acting in a tangential direction to the pinion 50, but also by a force fv (force from the rack 96 in the direction to push the pinion 50 away) acting in a direction towards the pinion 50 axis.

The rotation shaft support 54 of the pinion 50 is supported by the cover plate 100 at the circular hole 102. Due to the circular hole 102 that supports the pinion 50 being disposed on the cover plate 100 side of the pinion teeth 52A, there is misalignment in the pinion 50 axial direction between the point where the force f acts and the point where the circular hole 102 provides support.

Due to this misalignment, when the force acts on the pinion 50, a tilting moment arises that acts to push the pinion 50 away from the rack 96 (in the arrow C direction in FIG. 6A). Tilting movement of the pinion 50 is restricted by the outer peripheral face of the rotation shaft support 54 impinging on the circular hole 102, both at the edge portion 102A and at the edge portion 104A.

In the cover plate 100, the bar-ring molding 104 projects out from the plate portion 101, and the circular hole 102 passes through the plate portion 101 and the bar-ring molding 104 of the cover plate 100.

By making the axial direction distance between the edge portion 104A and the edge portion 102A of the circular hole 102 longer, the supported length of the pinion 50 by the circular hole 102 can be lengthened along the pinion 50 axial direction.

The strength of the circular hole 102 can be secured with the larger surface area with which the circular hole 102 supports the pinion 50. Sufficient meshing between the pinion 50 and the rack 96 can be achieved by suppressing tilting of the pinion 50, and the operational efficiency (transmission efficiency) from the rack 96 to the pinion 50 can be raised.

Consequently, by suppressing the cover plate 100 from becoming thicker in the pinion 50 axial direction, the webbing take-up device 10 can also be made more compact and lighter in weight.

The bar-ring molding 104 projects out from the plate portion 101 towards the pinion 50 side (the pinion teeth 52A side). The recess portion 53 is provided to the pinion 50 around the entire circumference of the rotation shaft support 54 on the face of the cog wheel 52. The bar-ring molding 104 is accommodated in the recess portion 53.

The bar-ring molding 104 projects out from the plate portion 101 towards the force f point of action side, shortening the separation distance h along the pinion 50 axial direction from the force f point of action to the edge portion 104A of the circular hole 102 (see FIG. 6A). The tilting moment acting on the pinion 50 can accordingly be lessened, making it more difficult for the pinion 50 to tilt.

The recess portion 53 can accommodate the projection of the bar-ring molding 104 towards the pinion 50 side (the pinion teeth 52A side), enabling the webbing take-up device 10 to be efficiently made more compact.

The non-contact faces 96B are also provided on the cover plate 100 side of the tip portions of the rack teeth 96A. Interference of the rack teeth 96A with the bar-ring molding 104 can accordingly be suppressed by the non-contact faces 96B when the rack teeth 96A are rotating the pinion 50.

Modified Example

Figure 7:
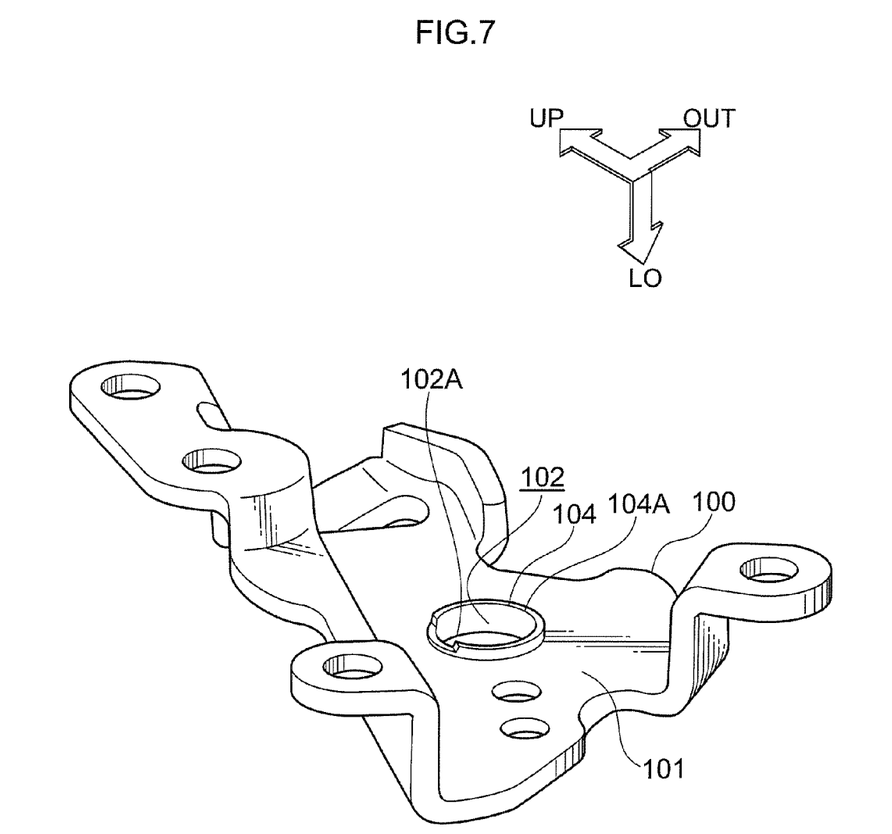
FIG. 7 is a perspective view illustrating a cover plate of a modified example of a webbing take-up device according to an exemplary embodiment of the present invention.
Figure 8:
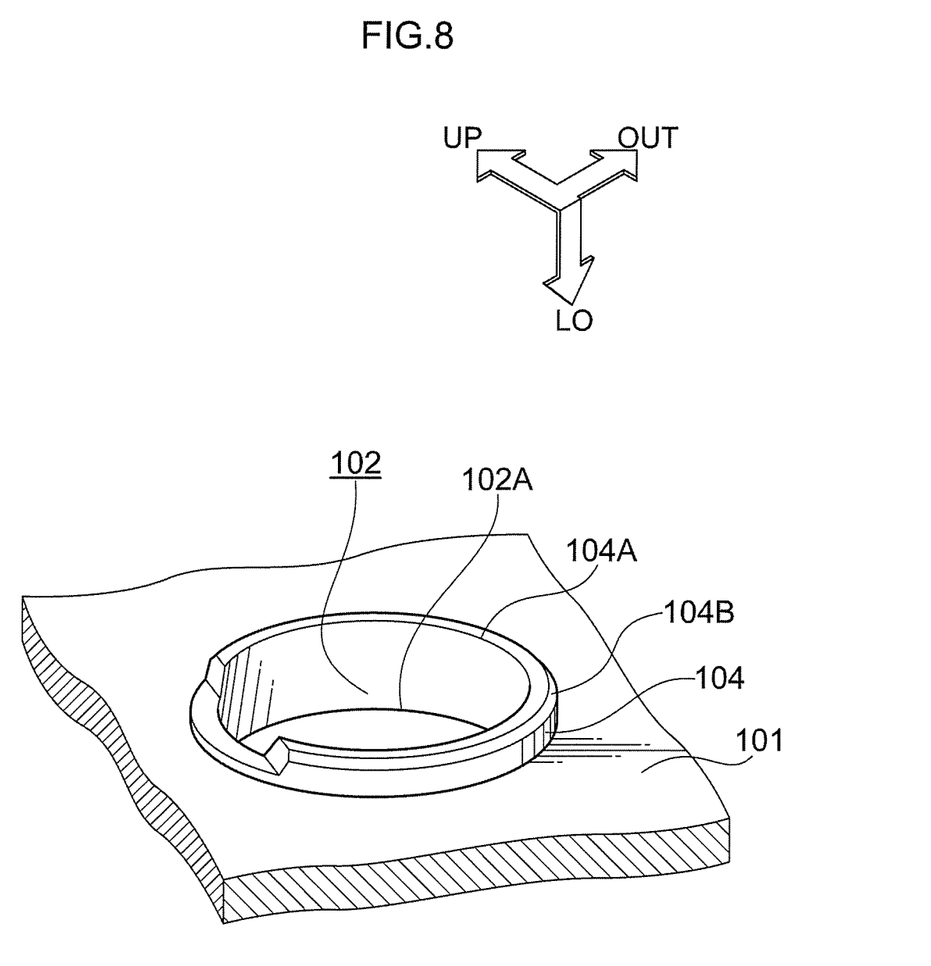
FIG. 8 is a perspective view illustrating a bar-ring molding of a modified example of the webbing take-up device according to the present invention.

As shown in FIG. 7 and FIG. 8, in the modified example the projection height of the bar-ring molding 104 on the rack 96 side is formed lower than the projection height of the bar-ring molding 104 on the opposite side from the rack 96.

According to the above configuration, when the pretensioner mechanism 36 is actuated, the force f from the rack teeth 96A acts on the cog wheel 52, and a tilting moment acts to push the pinion 50 away from the rack 96. However, tilting of the pinion 50 is restricted by interference of the outer peripheral face of the rotation shaft support 54 with the edge portion 102A on the rack 96 side of the circular hole 102, and with the edge portion 104A at the side of the circular hole 102 substantially opposite the rack 96.

Consequently, the pinion 50 does not impinge on the edge portion 104A at the rack 96 side of the circular hole 102. Accordingly suppression of tilting of the pinion 50 is not affected by the projection height of the bar-ring molding 104 on the rack 96 side of the circular hole 102 even if the projection height on the rack 96 side of the bar-ring molding 104 is made lower than the projection height on the side opposite from the rack 96.

The present modified example exhibits the same operation and effects as that of the aforementioned exemplary embodiment.

Furthermore, due to lowering the projection height of the bar-ring molding 104 on the rack 96 side, the tips of the rack teeth 96A on the rack 96 can be set so as to extend out further on the cover plate 100 side of the tips. The strength of the rack teeth 96A on the rack 96 can thereby be further raised.

In the present modified example the projection, height of the bar-ring molding 104 on the rack 96 side is set lower than the projection height of the bar-ring molding 104 on the opposite side to the rack 96. However, configuration may be made such that instead there is no bar-ring molding 104 formed at a portion of the rack 96 side of the cover plate 100.

In the present exemplary embodiment and the modified example, the bar-ring molding 104 is integrally formed with the cover plate 100. However configuration may be made with the bar-ring molding 104 provided as a separate body to the cover plate 100. For example, the bar-ring molding 104 is formed by an outset molding of resin on the cover plate 100. Such cases facilitate changes in the cross-section profile and projection height dimension of the bar-ring molding 104. The sliding properties between the pinion 50 and the bar-ring molding 104 can also be enhanced. Furthermore, for example, the circular hole 102 and the bar-ring molding 104 may be configured by press insertion of a circular cylindrical shaped member formed from metal into the cover plate 100.

Furthermore, configuration is made in the present exemplary embodiment and the modified example such that rotation of the spool 24 in the take-up direction is achieved by moving the piston 88 (movement member), meshing the piston 88 with the pinion 50 (rotation member) and rotating the pinion 50. However, as an alternative configuration may be made such that rotation of the spool 24 in the take-up direction is achieved by moving plural balls (movement members), meshing the plural balls with a pinion (rotation member) and rotating the pinion.

What is claimed is:

1. A webbing take-up device comprising:
   a take-up shaft on which webbing for fitting over a vehicle occupant is taken up by rotating the take-up shaft in a take-up direction;
   a movement member that is moved at a specific occasion such as when a vehicle collision is detected or when there is rapid vehicle deceleration, such that the movement member meshes with a rotation member;
   the rotation member comprising a coaxially provided rotation shaft support portion and a recess portion formed at an end portion in an axial direction of the rotation shaft support portion, the take-up shaft being rotated in the take-up direction by the rotation member meshing with the movement member and being rotated during movement of the movement member; and
   a cover member disposed on a rotation shaft support portion side of the rotation member, the cover member comprising a plate portion, a substantially ring shaped wall that projects out from the plate portion towards a rotation member side, and is accommodated in the recess portion of the rotation member, and a shaft bearing hole formed in the plate portion and the substantially ring shaped wall for supporting the rotation shaft support portion.

2. The webbing take-up device of claim 1, wherein:
   the movement member meshes with a portion of the recess portion of the rotation member; and
   the projection height of the substantially ring shaped wall is lower on a side of meshing between the movement member and the rotation member and higher on an opposite side to the meshing side.

3. The webbing take-up device of claim 2, wherein the substantially ring shaped wall has a shape which is formed along a peripheral edge of the shaft bearing hole.

4. The webbing take-up device of claim 1, wherein the substantially ring shaped wall has a shape which is formed along a peripheral edge of the shaft bearing hole.

5. The webbing take-up device of claim 1, wherein:
   the movement member meshes with a portion of the recess portion of the rotation member; and
   the substantially ring shaped wall is not formed at a side of meshing between the movement member and the rotation member but is formed at an opposite side to the meshing side.

* * * * *